United States Patent Office 3,509,239
Patented Apr. 28, 1970

3,509,239
POLYMERIC COMPOSITIONS BASED ON RUBBER AND COPOLYMERS OF PIPERYLENE WITH 2-METHYL-2-BUTENE
Gerald W. Tindall, Berwyn, Pa., assignor to The Goodyear Tire & Rubber Company, Akron, Ohio, a corporation of Ohio
No Drawing. Filed Feb. 27, 1967, Ser. No. 619,051
Int. Cl. C08c 9/08; C08d 9/08
U.S. Cl. 260—889                                    9 Claims

ABSTRACT OF THE DISCLOSURE

A composition and its method of preparation comprising an admixture of at least one rubber such as natural and synthetic rubber and as a tackifier therefor a synthetic resin comprising from about 40 to about 80 weight percent units derived from piperylene and from about 60 to about 20 weight percent units derived from 2-methyl-2-butene.

---

This invention relates to a method of imparting building tack to natural and synthetic rubber stocks. More particularly, this invention relates to the use of certain synethic resins as rubber tackifiers and the synthetic resin-rubber compositions prepared therefrom.

It is known that it is desired to add building tack to uncured natural rubber and uncured synthetic rubber stocks for various commercial applications. Building tack is generally referred to as the surface property of rubber which enables two pieces of unvulcanized rubber stock to adhere together when brought in contact under moderate pressure. Building tack is generally measured by the amount of force required to separate the two pieces of rubber stock during a short period of time. Tack is an important and necessary property of various rubber stocks in their uncured state in order that they may be commercially useful in the manufacture of tires, industrial products, rubberized fabrics and adhesives. If the natural tack of the rubber stocks is insufficient, various tackifiers must be mixed with them to increase their building tack. This problem is particularly evident in synthetic rubber stocks which normally have very little natural building tack. Synthetic rubber stocks prepared by the terpolymerization of ethylene, propylene and minor amounts of nonconjugated dienes, for example, usually have very litlle building tack and tackifiers normally used with other synthetic rubber stocks generally have little, if any, tackifying effect on these terpolymers.

Thus, it is an object of this invention to provide rubber stock compositions having improved building tack.

In accordance with this invention, it has been found that unobvious and unexpected results can be obtained with a rubber composition comprising an admixture of synthetic rubber and a synthetic resin, the synthetic resin comprising from about 40 to about 80 weight percent units derived from piperylene and from about 60 to about 20 weight percent units derived from 2-methyl-2-butene. It was particularly unexpected that a method of imparting building tack to synthetic rubber comprises admixing the synthetic resin with synthetic rubber. In the practice of this invention it was not only surprisingly found that the synthetic resin of this invention imparted tack to ethylene-propylene-diene terpolymer rubber stocks where other tackifiers did not, but also that the amount of tack imparted to such rubber stocks by the resin of this invention can increase for a period of time after admixing the resin with the rubber stocks.

The synthetic resin used in this invention is generally prepared by polymerizing a mixture comprising from about 20 to about 75 weight percent of piperylene and from about 80 to about 25 weight percent of 2-methyl-2-butene in the presence of an anhydrous metal halide catalyst. It is usually desired that the mixture to be polymerized comprises from about 35 to about 65 weight percent of piperylene and from about 65 to about 35 weight percent of 2-methyl-2-butene.

Various anhydrous metallic halide catalysts can be used to prepare the synthetic resin. Representative examples of such catalysts are fluorides, chlorides, bromides, and iodides of metals such as aluminum, tin, and boron. Such catalysts include, for example, aluminum chloride, stannic chloride, and boron trifluoride.

In carrying out the polymerization reaction, the hydrocarbon mixture is brought into contact with the anhydrous metal halide catalyst. Generally the catalyst is used in particulate form. Generally, a particle size in the range of from about 5 to about 200 mesh size is used although larger or smaller particles can be used. The amount of catalyst used is not critical although sufficient catalyst must be used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and reaction conducted without a diluent being present. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction.

A wide range of temperatures can be used for the polymerization reaction in preparing the synthetic resins. The polymerization can be carried out at temperatures in the range of from about −20° C. to about 100° C., although usually the reaction is carried out at a temperature in the range of from about 0° C. to about 50° C. The polymerization reaction pressure is not critical and may be atmospheric or above or below atmospheric pressure. Generally, a satisfactory polymerization can be conducted when the reaction is carried out at about autogenous pressure developed by the reactor under the operating conditions used. The time of the reaction is not generally crtical and reaction times can vary from a few seconds to 12 hours or more.

The synthetic resins can be modified by the addition of up to about 50 weight percent of piperylene dimers or piperylene trimers or other unsaturated hydrocarbons, particularly hydrocarbons containing from 4 to 6 carbon atoms, and mixtures thereof to the piperylene/2-methyl-2-butene mixture. Representative examples of such hydrocarbons are butene and substituted butenes such as 2-methyl-1-butene, 2,3-di-methyl-1-butene, 2,3-dimethyl-2-butene, 3,3-dimethyl-1-butene; the pentenes and substituted pentenes such as 1-pentene, 2-methyl-1-pentene, 2-methyl-2-pentene, 3-methyl-2-pentene, 4-methyl-1-pentene; 4-methyl-2-pentene, the hexenes such as 2-hexene, diolefins such as isoprene, and cyclic unsaturated hydrocarbons such as cyclopentene, cyclohexene and 1,3-cyclopentadiene.

The synthetic resins of this invention are characterized by having a softening point of from about 80° C. to about 110° C. according to ASTM method E28–58T. They usually have a specific gravity of from about .85 to about 1.0. The products can be treated, by steam stripping, for example, to remove lower molecular weight compounds and thus increase its softening point to a usually more desirable range of from about 90° C. to about 110° C. These resins are generally soluble in aliphatic hydrocarbons such as pentane, hexane, and heptane and aromatic hydrocarbons such as benzene and toluene. The materials are further characterized by having a composition comprising from about 40 to about 80 weight percent units derived from piperylene, correspondingly from about 60 to about 20 weight percent units derived from 2-methyl-2-butene and when modified as herein described, can contain up to about 25 weight percent units derived from piperylene dimers, piperylene trimers and other unsaturated hydrocarbons containing from 4 to 6 carbon atoms heretofore mentioned. The synthetic resins have a wide range of colors such as from about 0.1 to about 4 or even up to about 10 on the Barret scale.

The synthetic resins of this invention are used to impart building tack to uncured natural rubber and various synthetic rubber stocks by admixing the synthetic resins with the rubber stocks. Representative examples of the various synthetic rubbers are rubbery polymers of conjugated dienes including polybutadiene, polyisoprene, butadiene-styrene rubber, which is a copolymer of butadiene and styrene containing a major portion of butadiene, particularly copolymers of butadiene and styrene of the hot and cold SBR type which contain from about 60 to about 99 percent by weight butadiene, butyl rubber which is a polymerization product of a major portion of a monoolefin such as isobutylene and a minor portion of a diolefin such as butadiene or isoprene, copolymers of ethylene and propylene and terpolymers of ethylene, propylene and a minor portion of a diene. It is to be understood that mixtures of natural and synthetic rubber stocks, including reclaimed rubber, can also be used.

The rubbery copolymers of ethylene and propylene and the terpolymers of ethylene, propylene and a diene are particularly known for their lack of building tack. Rubbery ethylene-propylene copolymers can be used having various ratios of ethylene and propylene. Representative of the ethylene-propylene copolymers are copolymers having from about 80 to about 20 weight percent units derived from ethylene and correspondingly from about 20 to about 80 weight percent units derived from propylene.

Various nonconjugated dienes can be used to prepare the rubbery terpolymers of ethylene, propylene and a diene. Representative examples of the nonconjugated dienes are aliphatic dienes having from 6 to 22 carbon atoms such as 1,4-hexadiene, 1,5-heptadiene, 1,9-octadiene, 6-methyl-1,5-heptadiene, 7-methyl-1,6-octadiene, 11-ethyl-1,11, tridecadiene, 9-ethyl-1,9-undecadiene, 7-ethyl-1,7-nonadiene, 8-propyl-1,8-undecadiene, 8-ethyl-1,8-decadiene, 10-ethyl-1,9-dodecadiene, 12-ethyl - 1,12 - tetradecadiene, 13-n-butyl-1,12-tridecadiene and 15-ethyl-1,15-heptadecadiene, and cycloaliphatic dienes and substituted cycloaliphatic dienes such as dicyclopentadiene and 5-alkenyl-substituted -2-norbornenes such as 5-methylene-2-norbornene, 5-ethylidene-2-norbornene, and 2-alkyl-2,5-norborndienes such as 2-methyl-2,5-norbordiene. The generally preferred nonconjugated dienes are 1,4-hexadiene, dicyclopentadiene, 5-methylene-2-norborrene and 5-ethylidine-2-norbornene. Usually such terpolymers contain from about 20 to about 75 weight percent units derived from ethylene, from about 25 to about 80 weight percent units derived from propylene and from about 1 to about 15 weight percent units derived from the diene.

In the practice of this invention various amounts of the synthetic resin can be added to rubber stocks to impart building tack. Such amounts are largely dependent upon the rubber stocks used and upon the intended use of the rubber stocks. Generally from about 2 to about 100 parts of the synthetic resin per 100 parts by weight of rubber is suitable and usually from about 5 to about 30 parts of synthetic resin per hundred parts of rubber is preferred. Also, in the practice of this invention it is understood that rubber additives normally used in compounding the various rubbers such as pigments, fillers, vulcanizers, carbon black, processing oils, plasticizers, accelerators, stabilizers, oxidation inhibitors and the like can also be admixed with the rubber stocks.

The following examples further illustrate the invention and are not intended to be limiting. In these examples, parts and percentages are by weight unless otherwise indicated.

EXAMPLE 1

A synthetic resin suitable as a rubber tackifier in this invention was prepared by the following method:

In a suitable reactor was placed 50 parts of heptane and 3.08 parts of anhydrous aluminum chloride. The mixture was cooled to about 5° C. While continuously stirring the mixture, 200 parts of a hydrocarbon mixture was slowly added to the reactor over a period of about 30 minutes. The hydrocarbon mixture had the following composition.

| Component: | Percent |
| --- | --- |
| 2-pentene | 4.8 |
| 2-methyl-2-butene | 42.2 |
| Isoprene | 2.5 |
| 1,3-pentadiene | 42.4 |
| 2,3-dimethyl-1-butene | 2.6 |
| Unsaturated hydrocarbons containing 5 to 6 carbon atoms | 5.5 |
| | 100.0 |

The temperature of the reaction was maintained in a range of about 5° to 10° C. Approximately 100 parts of water was added to the mixture to decompose the aluminum chloride. The mixture was filtered to remove particles of decomposed aluminum chloride. The filtrate separated into an organic layer containing heptane, the polymerization product and unreacted hydrocarbons and a water layer. The water layer was drained from the filtrate. The organic layer was flash distilled by first heating it to 50° C. to remove unreacted hydrocarbons following which the pressure was reduced to about 10 millimeters of mercury pressure absolute and the pot temperature was increased to 290° C. The resulting residual molten resin was poured from the pot onto an aluminum tray and cooled to about 23° C. to form 121 parts of a hard brittle resin having a pale yellow color and a softening point, according to ASTM method E28–58T of 94° C.

EXAMPLES 2, 3, 4, 5, 6 AND 7

Samples of an ethylene, propylene, 1,4-hexadiene terpolymer having an ethylene to propylene mol ratio of 71:29, an unsaturation of 0.24 mol of carbon-to-carbon double bonds per kilogram of polymer, and a dilute solution viscosity of 1.7, herein referred to as EPDM were compounded by the following recipes with portions of a synthetic resin having a softening point of about 93° C. and prepared according to the method of Example 1. For comparison purposes, no synthetic resin tackifier was used in Examples 2 and 3 and varying amounts of the synthetic resin was used in Examples 4 through 7.

The pressure was released and the strips allowed to relax for 30 seconds, after which the strips were tested for

| Compounds | Amounts of Compounds used | | | | | |
|---|---|---|---|---|---|---|
| | Example 2 | Example 3 | Example 4 | Example 5 | Example 6 | Example 7 |
| EPDM | 100 | 100 | 100 | 100 | 100 | 100 |
| Antioxidant [1] | | 0.5 | 0.5 | 0.5 | 0.5 | 0.5 |
| Zinc oxide | 20 | 20 | 20 | 20 | 20 | 20 |
| Stearic acid | 1.0 | 1.0 | 1.0 | 1.0 | 1.0 | 1.0 |
| SRF Carbon black | 75.0 | 75.0 | 75.0 | 75.0 | 75.0 | 75.0 |
| Medium process oil [2] | 25.0 | 25.0 | 22.5 | 20.0 | 17.5 | 15.0 |
| Synthetic resin | | | 5.0 | 10.0 | 15.0 | 20.0 |
| Sulfur | 1.5 | 1.5 | 1.5 | 1.5 | 1.5 | 1.5 |
| 2-mercaptobenzothiazole | 1.0 | 1.0 | 1.0 | 1.0 | 1.0 | 1.0 |
| Tetramethylthiuram monosulfide | 1.5 | 1.5 | 1.5 | 1.5 | 1.5 | 1.5 |

[1] A substituted phenolic type of antioxidant.
[2] A nonstaining petroleum derived naphthenic-paraffinic oil having a viscosity of from 36 to 40 Saybolt universal seconds at 210° F.

The compounded EPDM-synthetic resin samples were prepared by the following method:

To a Banbury mixer, size 00 (machine Number 54260, made by The Farrel Birmingham Company, having water cooling compartments) were charged the EPDM, zinc oxide, stearic acid, carbon black, process oil and synthetic resin. This mixture was mixed at 65 r.p.m. for about 15 minutes. The temperature of the mixture was about 25° C. at the beginning of the mixing process and increased to an average temperature of from about 120° C. to about 160° C. The EPDM mixture was removed from the Banbury mixer and cooled to about 25° C. To the Banbury mixer, which was also cooled to about 25° C. was then recharged the cooled EPDM mixture and the sulfur, 2-mercapto benzothiazole and tetramethyl thiuram monosulfide. The mixture was mixed at 65 r.p.m. for about 2 minutes where the temperature of the mixture increased to an average of from about 90° C. to about 120° C. The mixer was stopped and the compounded EPDM mixture removed.

Rectangular strips were prepared from the compounded EPDM mixture having a thickness of 0.05 inch and dimensions of ¾ inch by 10 inches. A backing of masking tape (obtained as Scotch brand masking tape from The Minnesota Mining & Manufacturing Company) was adhered to one side of the strips to prevent unnecessary stretching of the samples. The prepared rectangular strips were tested for tack in a Ketjen tackmeter. (The Ketjen tackmeter is referred to and described by O. K. F. Bussemaker and W. B. C. van Beek in Rubber Chemistry & Technology, vol. XXXVII, No. 1, pp. 28–37, January-March 1964.) The strips were pressed onto the film strip of the tackmeter, the said film strip having a slot measuring ¼ inch by 7 inches, at a pressure of about 1.5 kilograms per square centimeter gauge for 30 seconds at about 25° C.

tack at the tackmeter's regular speed of 9 inches per minute. The results of the test were obtained as units of kilograms of force.

TACK (MEDIAN VALUES OF KILOGRAMS OF FORCE)

| Compounded mixture | Example Number | | | | | |
|---|---|---|---|---|---|---|
| | 2 | 3 | 4 | 5 | 6 | 7 |
| Tested within 24 hours after preparation | 1.22 | 1.63 | 1.40 | 1.65 | 2.10 | [1] >2.20 |
| Tested after storage of the mixture for 7 days at about 25° C. | 0.25 | .33 | 1.95 | [1] >2.20 | [1] >2.20 | [1] >2.20 |

[1] The upper limit of measure of the Tackmeter is 2.20 kilograms. The tack developed by these samples was greater than 2.20 kilograms and thus could not be measured by the Tackmeter.

Samples of the compounded EPDM mixture were cured for 20 minutes at 305° F. and submitted to standard tests with the following results:

| | Example Number | | | | | |
|---|---|---|---|---|---|---|
| | 2 | 3 | 4 | 5 | 6 | 7 |
| Tensile (pounds per square inch) | 1,525 | 1,500 | 1,600 | 1,675 | 1,850 | 1,925 |
| Elongation (inches) | 520 | 570 | 625 | 710 | 760 | 825 |
| 300% Modulus | 925 | 900 | 800 | 675 | 600 | 500 |
| Shore A Hardness | 63 | 62 | 62 | 61 | 60 | 58 |
| (The following samples were cured for 35 minutes at 305° F.) | | | | | | |
| Tear Test (pounds per inch) (ASTM Test D-624-54): | | | | | | |
| Die B | 141 | 173 | 143 | 176 | 179 | 186 |
| Die C | 155 | 152 | 166 | 169 | 178 | 188 |
| De Mattia Flex Test (minutes for one inch growth) (ASTM Test D-813-59) | 49 | 74 | 111 | 376 | 910 | 1,540 |

Thus, an admixture of the synthetic resin of this invention with the ethylene, propylene, diene terpolymer had a substantially improved building tack as compared to the terpolymer without the resin. Although the terpolymer had *some* tack immediately after its preparation, mixing 10 parts of the synthetic resin with the terpolymer increased its tack by about 35 percent. After seven days of storage, the terpolymer showed almost no tack while the terpolymer having only 10 parts of the resin showed more tack than could be measured by the tachmeter. Also, surprisingly, the addition of the synthetic resin to the terpolymer resulted in a substantial increase in physical properties of the terpolymer such as tensile strength and flex life. Because most of the physical properties of the terpolymer are not significantly detrimentally affected by the addition of the synthetic resin, the resin is also effective as an extender for the terpolymer.

In the practice of this invention, other suitable rubber stocks, particularly synthetic rubber stocks which are deficient in building tack, can be substituted for the terpolymer used in this example with the attendant advantages such as, for example, the increase in tack. Representative examples of the rubber stocks are those hereinbefore mentioned, which include butyl rubber, copolymers of ethylene and propylene, and terpolymers of ethylene, propylene, and a minor portion of a nonconjugated diene. Particularly suitable terpolymers are terpolymers of propylene and dicyclopentadiene; ethylene, propylene, and 5-ethylidine-2-norbornene; and ethylene, propylene and 5-methylene-2-norbornene. It is to be understood that the terms rubber, rubbery and rubber stock refer to elastomeric materials which generally have an elongation of at least 100 percent of their original lengths at about 25° C. before breaking, and generally have the property of returning to their original shape after stretching the material to at least 100 percent of its original length at about 25° C. with very low hysteresis.

The term "dilute solution viscosity" as used in this specification is defined as the ($\log_e$ relative viscosity)/ (grams of polymer/100 milliliters of solution). "Relative viscosity" is the viscosity of a solution of 0.5 gram of the polymer per 100 milliliters of solution at 30° C. divided by the viscosity of the solvent at 30° C. Toluene was used as the solvent.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising an admixture of at least one rubber selected from the group consisting of natural rubber, synthetic diolefin rubber, ethylene-propylene copolymers and ethylene-propylene-diene terpolymers and as a tackifier therefore, a synthetic resin having a softening point of from about 80° C. to about 110° C., and consisting essentially of units derived from unsaturated olefin hydrocarbons and comprising from about 40 to about 80 weight percent units derived from piperylene and from about 60 to about 20 weight percent units derived from 2-methyl-2-butene wherein the composition comprises from about 2 to about 100 parts of the synthetic resin per 100 parts by weight of the rubber.

2. A composition according to claim 1 wherein the rubber is a synthetic rubber selected from the group consisting of polybutadiene, polyisoprene, butadiene-styrene rubber, butyl rubber, ethylene-propylene copolymers, and ethylene-propylene-diene terpolymers.

3. A composition according to claim 2 wherein the synthetic rubber is selected from ethylene-propylene copolymers and ethylene-propylene-diene terpolymers and wherein the ethylene-propylene-diene terpolymer comprises from about 20 to about 75 weight percent units derived from ethylene, from about 25 to about 80 weight percent units derived from propylene, and from about 1 to about 15 weight percent units derived from a nonconjugated diene.

4. A composition according to claim 3 wherein the nonconjugated diene is selected from at least one of the group consisting of aliphatic dienes having from 6 to 22 carbon atoms, dicyclopentadiene, and 5-alkenyl-substituted-2-norbornenes.

5. A composition according to claim 4 wherein the nonconjugated diene is selected from at least one of the group consisting of 1,4-hexadiene, dicyclopentadiene, 5-methylene-2-norbornene, and 5-ethylidine-2-norbornene.

6. A composition according to claim 5 wherein the synthetic resin is modified by having up to about 25 weight percent units derived from at least one other unsaturated hydrocarbon containing from 4 to 6 carbon atoms, the said modified resin having a softening point of from about 80° C. to about 110° C.

7. A composition according to claim 5 where the nonconjugated diene is 1,4-hexadiene.

8. A composition according to claim 6 where the other unsaturated hydrocarbons are selected from 2-methyl-1-butene, 2,3-dimethyl-1-butene, 2,3-dimethyl-2-butene, 3,3-dimethyl-1-butene, 1-pentene, 2-pentene, 2-methyl-1-pentene, 2-methyl-2-pentene, 3-methyl-2-pentene, 4-methyl-1-pentene, 4-methyl-2-pentene, 2-hexene, isoprene, cyclopentene, cyclohexene and 1,3-cyclopentadiene.

9. A composition according to claim 2 wherein the synthetic resin is modified by having up to about 25 weight percent units derived from at least one of the group consisting of piperylene dimers, piperylene trimers, and other unsaturated hydrocarbons containing from 4 to 6 carbon atoms.

References Cited
UNITED STATES PATENTS 2,497,458   2/1950   Kurtz _____ 260—888

MURRAY TILLMAN, Primary Examiner

M. J. TULLY, Assistant Examiner

U.S. Cl. X.R.

260—2.3, 5, 41.5, 79.5, 80.7, 82, 85.3, 888

PO-1050
(5/69)

UNITED STATES PATENT OFFICE
CERTIFICATE OF CORRECTION

Patent No. 3,509,239      Dated April 28, 1970

Inventor(s) Gerald W. Tindall

It is certified that error appears in the above-identified patent and that said Letters Patent are hereby corrected as shown below:

Column 3, line 4, after "1-pentene", insert -- 2-pentene --.

line 74, correct the spelling of "norbornadiene" in both occurrences.

Column 4, line 1, "norborrene" should read "norbornene".

Column 5, under the first Table, insert -- 7 -- after "Example".

SIGNED AND SEALED
NOV 3 1970

(SEAL)
Attest:

Edward M. Fletcher, Jr.
Attesting Officer

WILLIAM E. SCHUYLER, JR.
Commissioner of Patents